(12) United States Patent
Goto

(10) Patent No.: US 7,999,048 B2
(45) Date of Patent: Aug. 16, 2011

(54) PROCESS FOR PRODUCING PREPOLYMERIZATION CATALYST FOR POLYMERIZATION OF OLEFIN AND PROCESS FOR PRODUCING OLEFIN POLYMER

(75) Inventor: Tomoaki Goto, Kisarazu (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 595 days.

(21) Appl. No.: 11/882,984

(22) Filed: Aug. 8, 2007

(65) Prior Publication Data

US 2008/0039602 A1    Feb. 14, 2008

(30) Foreign Application Priority Data

Aug. 11, 2006  (JP) ............................... P2006-219484
May 29, 2007  (JP) ............................... P2007-141544

(51) Int. Cl.
*C08F 4/44* (2006.01)
*C08F 210/00* (2006.01)
*B01J 31/00* (2006.01)
*B01J 37/00* (2006.01)

(52) U.S. Cl. .................. 526/125.1; 526/124.3; 526/348; 502/103; 502/104; 502/115; 502/116; 502/125

(58) Field of Classification Search .................. 502/104, 502/103, 115, 116, 125; 526/125.1, 124.3, 526/348
See application file for complete search history.

(56) References Cited

U.S. PATENT DOCUMENTS

| | | | |
|---|---|---|---|
| 4,897,455 A | 1/1990 | Welborn, Jr. | |
| 5,700,749 A * | 12/1997 | Tsutsui et al. ................ | 502/117 |
| 6,645,901 B2 * | 11/2003 | Goto et al. .................... | 502/104 |
| 7,022,782 B2 | 4/2006 | Ogane | |
| 2002/0143124 A1 | 10/2002 | Ogane | |
| 2003/0069127 A1 | 4/2003 | Takaoki et al. | |

FOREIGN PATENT DOCUMENTS

| | | |
|---|---|---|
| EP | 0241947 A2 | 10/1987 |
| EP | 0381364 A1 | 8/1990 |
| EP | 0475603 A1 | 3/1992 |
| EP | 0 723 976 B1 | 3/2004 |
| JP | S 58-201802 A | 11/1983 |
| JP | 59-126406 A | 7/1984 |
| JP | 61-108610 | 5/1986 |
| JP | 61-296008 | 12/1986 |
| JP | 63-89505 | 4/1988 |
| JP | 02-233708 A | 9/1990 |
| JP | 04-234409 A | 8/1992 |
| JP | 6-336502 | 12/1994 |
| JP | 07-062009 A | 3/1995 |
| JP | 9-221512 | 8/1997 |
| JP | 2003-171412 | 6/2003 |
| JP | 2005-68170 | 3/2005 |
| JP | 2005-68170 A | 3/2005 |

* cited by examiner

*Primary Examiner* — William K Cheung
(74) *Attorney, Agent, or Firm* — Fitch, Even, Tabin & Flannery

(57) ABSTRACT

There is provided a process for producing a prepolymerization catalyst for polymerization of an olefin, said process comprising the steps of feeding, to a polymerization reactor, an olefin and a solid catalyst component in which a catalyst component for polymerization of the olefin is carried on a fine particle support, and prepolymerizing the olefin in the presence of the solid catalyst component in the polymerization reactor, to thereby obtain the prepolymerization catalyst in which the olefin is prepolymerized on the solid catalyst component, characterized in that said solid catalyst component is pressure-fed to the polymerization reactor from a catalyst feeder connected to the polymerization reactor, and in that the inner pressure of the catalyst feeder at the start of the pressure-feeding is set at (Pr+0.0001) to (Pr+1) (MPa in unit) (in which Pr represents the inner pressure of the polymerization reactor (MPa in unit) at the start of the pressure-feeding).

6 Claims, No Drawings

PROCESS FOR PRODUCING PREPOLYMERIZATION CATALYST FOR POLYMERIZATION OF OLEFIN AND PROCESS FOR PRODUCING OLEFIN POLYMER

BACKGROUND OF THE INVENTION

1. Field of the Invention

The present application has been filed claiming the Paris Convention priority based on the Japanese patent application No. 2006-219484 (filed on Aug. 11, 2006) and the Japanese patent application No. 2007-141544 (filed on May 29, 2007), and a whole of the descriptions of the applications are herein fully incorporated in the description of the present specification by reference.

The present invention relates to a process for producing a prepolymerization catalyst for polymerization of an olefin, and a process for producing an olefin polymer using the same prepolymerization catalyst.

2. Description of the Related Art

As the gas phase polymerization process of an olefin, there is dominantly employed a process for obtaining a particle-like polymer by supplying a solid catalyst and an olefin into a fluidized bed reactor, and polymerizing the olefin on the fluidized bed. This process is known to simplify the production process or to reduce the production cost in comparison with a liquid phase polymerization process, because a polymer precipitation step and a polymer separation step after the polymerization is unnecessary in this process. As such a gas phase polymerization process, there is proposed a process for subjecting an olefin to gas phase polymerization in a fluidized bed reactor, using a so-called prepolymerization catalyst. This prepolymerization catalyst is prepared by prepolymerizing an olefin in the presence of a solid catalyst component in which a catalyst component for polymerization of an olefin is carried on a fine particle support, for example, methylaluminoxane and a metallocene compound carried on silica (cf. JP-A-9-221512).

However, there are disadvantages in this gas phase polymerization of the olefin by using the conventional prepolymerization catalyst obtained by prepolymerizing the olefin in the presence of the above solid catalyst component in which the catalyst component for polymerization of the olefin is carried on the fine particle support: that is, an agglomeration of the particles occurs during the gas phase polymerization and hinders the fluidization of the resulting polyolefin particles and the catalyst particles, which results in inhomogeneous mixing of the particles on the fluidized bed; and such an agglomeration clogs the outlet of the fluidized bed reactor when the polyolefin particles are drawn out of the fluidized bed reactor.

Under such circumstances, an object of the present invention is to provide a process for producing a prepolymerization catalyst for polymerization of an olefin, the use of such a polymerization catalyst being effective to suppress the agglomeration of particles during the gas phase polymerization of the olefin in a fluidized bed reactor, and another object thereof is to provide a process for producing an olefin polymer by using the same prepolymerization catalyst for polymerization of olefin, produced by the above process.

SUMMARY OF THE INVENTION

Firstly, the present invention provides a process for producing a prepolymerization catalyst for polymerization of an olefin. This process comprises the steps of supplying, into a polymerization reactor, an olefin and a solid catalyst component in which a catalyst component for polymerization of the olefin is carried on a fine particle support, and prepolymerizing the olefin in the presence of the solid catalyst component in the polymerization reactor to obtain the prepolymerization catalyst, and this process is characterized in that the solid catalyst component is pressure-fed to the polymerization reactor from a catalyst feeder connected to the polymerization reactor, and in that the inner pressure of the catalyst feeder found at the start of the pressure-feeding is set at (Pr+0.0001) to (Pr+1) (MPa in unit), provided that Pr represents the inner pressure (MPa in unit) of the polymerization reactor at the start of the pressure-feeding.

Secondly, the present invention provides a process for producing an olefin polymer, and this process is characterized in that the prepolymerization catalyst obtained by the above process is supplied into a fluidized bed reactor to carry out the gas phase polymerization of the olefin.

According to the present invention, there are provided a process for producing a prepolymerization catalyst for polymerization of an olefin, the use of such a prepolymerization catalyst being effective to suppress the agglomeration of particles during the gas phase polymerization of the olefin in a fluidized bed reactor, and a process for producing an olefin polymer using the same prepolymerization catalyst obtained by the above process.

DESCRIPTION OF THE PREFERRED EMBODIMENTS

The prepolymerization catalyst for polymerization of an olefin, according to the present invention, is obtained by prepolymerizing an olefin on a solid catalyst component in which a catalyst component for polymerizing the olefin is carried on a fine particle support.

The fine particle support to be used in the present invention is preferably porous. As such a support, an inorganic oxide such as $SiO_2$, $Al_2O_3$, $MgO$, $ZrO_2$, $TiO_2$, $B_2O_3$, $CaO$, $ZnO$, $BaO$, $ThO_2$ or the like; clay or a clay mineral such as smectite, montmorillonite, hectolite, laponite, saponite or the like; or an organic polymer such as polyethylene, polypropylene, styrene-divinylbenzene copolymer or the like is used.

The weight-average particle diameter of the fine particle support is usually from 10 to 100 μm, preferably from 20 to 80 μm, more preferably from 30 to 60 μm. The pore capacity of the fine particle support is usually 0.3 to 10 ml/g, and is measured mainly by the gas adsorption method (the BJH method). The specific surface area of the fine particle support is usually from 10 to 1,000 $m^2/g$, and is measured mainly by the gas adsorption method (the BET method).

As the catalyst component for polymerization of an olefin, to be carried on the fine particle support, the following components (I), (II), etc. can be exemplified:

(I) metallocene compounds, and
(II) compounds which ionize metallocene compounds to form ionic complexes.

The metallocene compound as the component (I) is a compound having a cyclopentadiene type anionic skeleton, and is preferably a transition metal compound represented by the following general formula [1] or a dimer of the μ-oxo type transition metal compound thereof:

$$L^1{}_a M^1 X^1{}_b \qquad [1],$$

wherein "a" represents a number that satisfies the formula of $0 < a \leq 8$, and "b" represents a number that satisfies the formula of $0 < b \leq 8$; $M^1$ represents a transition metal atom in any of Groups 3 to 11 of the Periodic Table or a transition metal atom in lanthanide series; $L^1$ represents a group having a cyclopentadiene type anion skeleton, provided that, when a plural number of $L^1$s are present, they may be directly bonded to each other, or may be bonded to each other through a residue containing a carbon atom, a silicon atom, a nitrogen atom, an oxygen atom, a sulfur atom or a phosphorus atom; and $X^1$ represents a halogen atom, a hydrocarbyl group (excluding a group having a cyclopentadiene type anion skeleton) or a hydrocarbyloxy group.

In the general formula [1], $M^1$ represents a transition metal atom in any of Groups 3 to 11 of the Periodic Table (IUPAC, 1989) or a transition metal atom in lanthanide series. Specific examples thereof include a scandium atom, an yttrium atom, a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom, an ytterbium atom and the like. $M^1$ in the general formula [4] is preferably a titanium atom, a zirconium atom, a hafnium atom, a vanadium atom, a chromium atom, an iron atom, a cobalt atom or a nickel atom, particularly preferably a titanium atom, a zirconium atom or a hafnium atom, and most preferably a zirconium atom.

In the general formula [1], "a" represents a number satisfying the formula of $0<a\leq8$, and "b" represents a number satisfying the formula of $0<b\leq8$, and "a" and "b" are appropriately selected in accordance with the valence of $M^1$. When $M^1$ is a titanium atom, a zirconium atom or a hafnium atom, "a" is preferably 2, and also, "b" is preferably 2.

In the general formula [1], $L^1$ represents a group having a cyclopentadiene type anion skeleton, provided that, when a plural number of $L^1$s are present, they may be the same or different. Examples of the group having a cyclopentadiene type anion skeleton, represented by $L^1$, include $\eta^5$-(substituted)cyclopentadienyl groups, $\eta^5$-(substituted)indenyl groups, $\eta^5$-(substituted)fluorenyl groups and the like. Specific examples thereof include a $\eta^5$-cyclopentadienyl group, a $\eta^5$-methylcyclopentadienyl group, a $\eta^5$-ethylcyclopentadienyl group, a $\eta^5$-n-butylcyclopentadienyl group, a $\eta^5$-tert-butylcyclopentadienyl group, a $\eta^5$-1,2-dimethylcyclopentadienyl group, a $\eta^5$-1,3-dimethylcyclopentadienyl group, a $\eta^5$-1-methyl-2-ethylcyclopentadienyl group, a $\eta^5$-1-methyl-3-ethylcyclopentadienyl group, a $\eta^5$-1-tert-butyl-2-methylcyclopentadienyl group, a $\eta^5$-1-tert-butyl-3-methylcyclopentadienyl group, a $\eta^5$-1-methyl-2-isopropylcyclopentadienyl group, a $\eta^5$-1-methyl-3-isopropylcyclopentadienyl group, a $\eta^5$-1-methyl-2-n-butylcyclopentadienyl group, a $\eta^5$-1-methyl-3-n-butylcyclopentadienyl group, a $\eta^5$-1,2,3-trimethylcyclopentadienyl group, a $\eta^5$-1,2,4-trimethylcyclopentadienyl group, a $\Theta^5$-tetramethylcyclopentadienyl group, a $\eta^5$-pentamethylcyclopentadienyl group, a $\eta^5$-indenyl group, a $\eta^5$-4,5,6,7-tetrahydroindenyl group, a $\eta^5$-2-methylindenyl group, a $\eta^5$-3-methylindenyl group, a $\eta^5$-4-methylindenyl group, a $\eta^5$-5-methylindenyl group, a $\eta^5$-6-methylindenyl group, a $\eta^5$-7-methylindenyl group, a $\eta^5$-2-tert-butylindenyl group, a $\eta^5$-3-tert-butylindenyl group, a $\eta^5$-4-tert-butylindenyl butylindenyl group, a $\eta^5$-5-tert-butylindenyl group, a $\eta^5$-6-tert-butylindenyl group, a $\eta^5$-7-tert-butylindenyl group, a $\eta^5$-2,3-dimethylindenyl group, a $\eta^5$-4,7-dimethylindenyl group, a $\eta^5$-2,4,7-trimethylindenyl group, a $\eta^5$-2-methyl-4-isopropylindenyl group, a $\eta^5$-4,5-benzindenyl group, a $\eta^5$-2-methyl-4,5-benzindenyl group, a $\eta^5$-4-phenylindenyl group, a $\eta^5$-2-methyl-5-phenylindenyl group, a $\eta^5$-2-methyl-4-phenylindenyl group, a $\eta^5$-2-methyl-4-naphthylindenyl group, a $\eta^5$-fluorenyl group, a $\eta^5$-2,7-dimethylfluorenyl group, a $\eta^5$-2,7-di-tert-butylfluorenyl group, and substitutes of the same, and the like. In some cases, "$\eta^5$-" may be omitted in the names of the transition metal compounds.

The groups having the cyclopentadiene type anion skeletons, or the group having the cyclopentadiene type anion skeleton and $X^1$ may be directly bonded to each other, respectively, or may be bonded to each other through a bridging group containing a carbon atom, a silicon atom, a nitrogen atom, an oxygen atom, a sulfur atom or a phosphorus atom. Examples of such a bridging group include alkylene groups such as an ethylene group and a propylene group; substituted alkylene groups such as a dimethylmethylene group and a diphenylmethylene group; substituted or non-substituted silylene groups such as a silylene group, a dimethylsilylene group, a diphenylsilylene group and a tetramethyldisilylene group; and hetero atoms such as a nitrogen atom, an oxygen atom, a sulfur atom and a phosphorus atom.

In the general formula [1], $X^1$ is a halogen atom, a hydrocarbyl group (excluding the group having a cyclopentadiene type anion skeleton) or a hydrocarbyloxy group. Specific examples of the halogen atom include a fluorine atom, a chlorine atom, a bromine atom and an iodine atom. Examples of the hydrocarbyl group herein referred to do not include a group having a cyclopentadiene type anion skeleton. Examples of the hydrocarbyl group include alkyl groups, aralkyl groups, aryl groups, alkenyl groups and the like; and examples of the hydrocarbyloxy group include alkoxy groups, aralkyloxy groups, aryloxy groups and the like.

Examples of the alkyl group include a methyl group, an ethyl group, a n-propyl group, an isopropyl group, a n-butyl group, a sec-butyl group, a tert-butyl group, an isobutyl group, a n-pentyl group, a neopentyl group, an amyl group, a n-hexyl group, a n-octyl group, a n-decyl group, a n-dodecyl group, a n-pentadecyl group, a n-eicosyl group and the like. Any one of these alkyl groups may be substituted with a halogen atom such as a fluorine atom, a chlorine atom, a bromine atom or an iodine atom. Examples of the alkyl group substituted with the halogen atom include a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group, a perbromopropyl group and the like. Moreover, any one of these alkyl groups may be partially substituted with an alkoxy group such as a methoxy group or an ethoxy group, an aryloxy group such as a phenoxy group, or an aralkyloxy group such as a benzyloxy group or the like.

Examples the aralkyl group include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl) methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl) methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl) methyl group, an (ethylphenyl)methyl group, a (n-propylphenyl)methyl group, an (isopropylphenyl)methyl group, a (butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl)

methyl group, a naphthylmethyl group, an anthracenylmethyl group and the like. Any one of these aralkyl groups may be partially substituted with a halogen atom such as a fluorine atom, a chlorine atom, a bromine atom or an iodine atom, an alkoxy group such as a methoxy group or an ethoxy group, an aryloxy group such as a phenoxy group, or an aralkyloxy group such as a benzyloxy group or the like.

Examples of the aryl group include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl group and the like. Any one of these aryl groups may be partially substituted with a halogen atom such as a fluorine atom, a chlorine atom, a bromine atom or an iodine atom, an alkoxy group such as a methoxy group or an ethoxy group, an aryloxy group such as a phenoxy group, or an aralkyloxy group such as a benzyloxy group or the like.

Examples of the alkenyl group include an allyl group, a methallyl group, a crotyl group, a 1,3-diphenyl-2-propenyl group and the like.

Examples of the alkoxy group include a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group, a n-icosoxy group and the like. Any one of these alkoxy groups may be partially substituted with a halogen atom such as a fluorine atom, a chlorine atom, a bromine atom or an iodine atom, an alkoxy group such as a methoxy group or an ethoxy group, an aryloxy group such as a phenoxy group, or an aralkyloxy group such as a benzyloxy group.

Examples of the aralkyloxy group include a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group, an anthracenylmethoxy group and the like. Any one of these aralkyloxy groups may be partially substituted with a halogen atom such as a fluorine atom, a chlorine atom, a bromine atom or an iodine atom, an alkoxy group such as a methoxy group or an ethoxy group, an aryloxy group such as a phenoxy group, or an aralkyloxy group such as a benzyloxy group or the like.

Examples of the aryloxy group include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group, an anthracenoxy group and the like. Any one of these aryloxy groups may be partially substituted with a halogen atom such as a fluorine atom, a chlorine atom, a bromine atom or an iodine atom, an alkoxy group such as a methoxy group or an ethoxy group, or an aralkyloxy group such as a benzyloxy group or the like.

Specific examples of the metallocene compound include bis(cyclopentadienyl)titanium dichloride, bis(methylcyclopentadienyl)titanium dichloride, bis(ethylcyclopentadienyl)titanium dichloride, bis(n-butylcyclopentadienyl) titanium dichloride, bis(tert-butylcyclopentadienyl)titanium dichloride, bis(1,2-dimethylcyclopentadienyl)titanium dichloride, bis(1,3-dimethylcyclopentadienyl)titanium dichloride, bis (1-methyl-2-ethylcyclopentadienyl)titanium dichloride, bis (1-methyl-3-ethylcyclopentadienyl)titanium dichloride, bis (1-methyl-2-n-butylcyclopentadienyl)titanium dichloride, bis(1-methyl-3-n-butylcyclopentadienyl)titanium dichloride, bis(1-methyl-2-isopropylcyclopentadienyl)titanium dichloride, bis(1-methyl-3-isopropylcyclopentadienyl)titanium dichloride, bis(1-tert-butyl-2-methylcyclopentadienyl) titanium dichloride, bis(1-tert-butyl-3-methylcyclopentadienyl)titanium dichloride, bis(1,2,3-trimethylcyclopentadienyl)titanium dichloride, bis(1,2,4-trimethylcyclopentadienyl)titanium dichloride, bis (tetramethylcyclopentadienyl)titanium dichloride, bis (pentamethylcyclopentadienyl)titanium dichloride, bis (indenyl)titanium dichloride, bis(4,5,6,7-tetrahydroindenyl) titanium dichloride, bis(fluorenyl)titanium dichloride, bis(2-phenylindenyl)titanium dichloride, bis[2-(bis-3,5-trifluoromethylphenyl)indenyl]titanium dichloride, bis[2-(4-tert-butylphenyl)indenyl]titanium dichloride, bis[2-(4-trifluoromethylphenyl)indenyl]titanium dichloride, bis[2-(4-methylphenyl)indenyl]titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl)titanium dichloride, cyclopentadienyl(indenyl)titanium dichloride, cyclopentadienyl(fluorenyl)titanium dichloride, indenyl(fluorenyl)titanium dichloride, pentamethylcyclopentadienyl(indenyl)titanium dichloride, pentamethylcyclopentadienyl(fluorenyl)titanium dichloride, cyclopentadienyl(2-phenylindenyl)titanium dichloride, pentamethylcyclopentadienyl(2-phenylindenyl)titanium dichloride, dimethylsilylenebis(cyclopentadienyl)titanium dichloride, dimethylsilylenebis(2-methylcyclopentadienyl)titanium dichloride, dimethylsilylenebis(3-n-methylcyclopentadienyl)titanium dichloride, dimethylsilylenebis(2-n-butylcyclopentadienyl)titanium dichloride, dimethylsilylenebis(3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis(3,4-dimethylcyclopentadienyl)titanium dichloride, dimethylsilylenebis(2,3-ethylmethylcyclopentadienyl)titanium dichloride, dimethylsilylenebis(2,4-ethylmethylcyclopentadienyl)titanium dichloride, dimethylsilylenebis(2,5-ethylmethylcyclopentadienyl)titanium dichloride, dimethylsilylenebis(3,5-ethylmethylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl)titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl)titanium dichloride, dimethylsilylenebis(2,4,7-trimethylindenyl)titanium dichloride, dimethylsilylenebis(2-methyl-4-isopropylindenyl)titanium dichloride, dimethylsilylenebis(4,5-benzindenyl)titanium dichloride, dimethylsilylenebis(2-methyl-4,5-benzindenyl)titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride, dimethylsilylenebis(2-methyl-5-phenylindenyl)titanium dichloride, dimethylsilylenebis(2-methyl-4-naphthylindenyl)titanium dichloride, dimethylsilylenebis(4,5,6,7-tetrahydroindenyl)titanium dichloride, dimethylsilylene(cyclopentadienyl)(indenyl)titanium dichloride, dimethylsilylene(methylcyclopentadienyl)(indenyl)titanium dichloride, dimethylsilylene(n-butylcyclopentadienyl)(indenyl)titanium dichloride, dimethylsilylene(tetramethylcyclopentadienyl)(indenyl)titanium dichloride, dimethylsilylene(cyclopentadienyl)(fluorenyl)titanium dichloride, dimethylsilylene(methylcyclopentadienyl)(fluorenyl)titanium dichloride, dimethylsilylene(n-butylcyclopentadienyl)(fluorenyl)titanium dichloride, dimethylsilylene(tetramethylcyclopentadienyl)(indenyl)titanium dichloride, dimethylsilylene(indenyl)(fluorenyl)titanium dichloride, dimethylsilylenebis(fluorenyl)titanium dichloride, dimethylsilylene(cyclopentadienyl)(tetramethylcyclopentadienyl)titanium dichloride, dimethylsilylene(tetramethylcyclopentadienyl)(fluorenyl)titanium dichloride, cyclopentadienyltitanium trichloride, pentamethylcyclopentadienyltitanium trichloride, cyclopentadienyl(dimethylamide)titanium dichloride, cyclopentadienyl(phenoxy)titanium dichloride, cyclopentadienyl (2,6-dimethylphenyl)titanium dichloride, cyclopentadienyl (2,6-diisopropylphenyl)titanium dichloride, cyclopentadienyl (2,6-di-tert-butylphenyl)titanium dichloride, pentamethylcyclopentadienyl (2,6-dimethylphenyl)titanium dichloride, pentamethylcyclopentadienyl (2,6-diisopropylphenyl)titanium dichloride, pentamethylcyclopentadienyl (2,6-tert-butylphenyl)titanium dichloride, indenyl (2,6-diisopropylphenyl)titanium dichloride, fluorenyl (2,6-diisopropylphenyl)titanium dichloride, dimethylsilylene(cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy)titanium dichloride, dimethylsilylene (cyclopentadienyl)(3-tert-butyl-2-phenoxy)titanium dichloride, dimethylsilylene (cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene (cyclopentadienyl)(3-tert-butyl-5-methoxy-2-phenoxy)titanium dichloride, dimethylsilylene (cyclopentadienyl)(3-tert-butyl-5-chloro-2-phenoxy)titanium dichloride, dimethylsilylene(cyclopentadienyl)(3,5-diamyl-2-phenoxy)titanium dichloride, dimethylsilylene(cyclopentadienyl)(3-phenyl-2-phenoxy)titanium dichloride, dimethylsilylene(cyclopentadienyl)(1-naphthoxy-2-yl)titanium dichloride, dimethylsilylene(methylcyclopentadienyl)(2-phenoxy)titanium dichloride, dimethylsilylene(methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene (methylcyclopentadienyl)(3-tert-butyl-2-phenoxy) titanium dichloride, dimethylsilylene (methylcyclopentadienyl)(3-tert-butyl-5-methyl-2-phenoxy)titanium dichloride, dimethylsilylene (methylcyclopentadienyl)(3,5-di-tert-butyl-2-phenoxy) titanium dichloride, dimethylsilylene (methylcyclopentadienyl)(5-methyl-3-phenyl-2-phenoxy) titanium dichloride, dimethylsilylene (methylcyclopentadienyl)(3-tert-butyldimethylsilyl-5-methyl-2-phenoxy)titanium dichloride, dimethylsilylene (methylcyclopentadienyl)(5-methyl-3-trimethylsilyl-2-phenoxy)titanium dichloride, dimethylsilylene (methylcyclopentadienyl)(3-tert-butyl-5-methoxy-2-phenoxy)titanium dichloride, dimethylsilylene (methylcyclopentadienyl)(3-tert-butyl-5-chloro)-2-phenoxy)titanium dichloride, dimethylsilylene (methylcyclopentadienyl)(3,5-diamyl-2-phenoxy) titanium dichloride, dimethylsilylene (methylcyclopentadienyl)(3-phenyl-2-phenoxy)titanium dichloride, dimethylsilylene(methylcyclopentadienyl)(1-naphthoxy-2-yl)titanium dichloride, dimethylsilylene(n-butylcyclopentadienyl)(2-phenoxy)titanium dichloride, dimethylsilylene (n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)

titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy)titanium dichloride, dimethylsilylene(n-butylcyclopentadienyl)(3-tert-butyl-5-chloro-2-phenoxy)titanium dichloride, dimethylsilylene(n-butylcyclopentadienyl)(3,5-diamyl-2-phenoxy)titanium dichloride, dimethylsilylene(n-butylcyclopentadienyl)(3-phenyl-2-phenoxy)titanium dichloride, dimethylsilylene(n-butylcyclopentadienyl)(1-naphthoxy-2-yl)titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy)titanium dichloride, dimethylsilylene(tert-butyl cyclopentadienyl)(5-methyl-3-phenyl-2-phenoxy)titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy)titanium dichloride, dimethylsilylene(tert-butylcyclopentadienyl)(3-tert-butyl-5-chloro-2-phenoxy)titanium dichloride, dimethylsilylene(tert-butylcyclopentadienyl)(3,5-diamyl-2-phenoxy)titanium dichloride, dimethylsilylene(tert-butylcyclopentadienyl)(3-phenyl-2-phenoxy)titanium dichloride, dimethylsilylene(tert-butylcyclopentadienyl)(1-naphthoxy-2-yl)titanium dichloride, dimethylsilylene(tetramethylcyclopentadienyl)(2-phenoxy)titanium dichloride, dimethylsilylene(tetramethylcyclopentadienyl)(3-methyl-2-phenoxy)titanium dichloride, dimethylsilylene(tetramethylcyclopentadienyl)(3,5-dimethyl-2-phenoxy)titanium dichloride, dimethylsilylene(tetramethylcyclopentadienyl)(3-tert-butyl-2-phenoxy)titanium dichloride, dimethylsilylene (tetramethylcyclopentadienyl)(3-tert-butyl-5-methyl-2-phenoxy)titanium dichloride, dimethylsilylene (tetramethylcyclopentadienyl)(3,5-di-tert-butyl-2-phenoxy)titanium dichloride, dimethylsilylene(tetramethylcyclopentadienyl)(5-methyl-3-phenyl-2-phenoxy)titanium dichloride, dimethylsilylene(tetramethylcyclopentadienyl)(3-tert-butyldimethylsilyl-5-methyl-2-phenoxy)titanium dichloride, dimethylsilylene(tetramethylcyclopentadienyl)(5-methyl-3-trimethylsilyl-2-phenoxy)titanium dichloride, dimethylsilylene(tetramethylcyclopentadienyl)(3-tert-butyl-5-methoxy-2-phenoxy)titanium dichloride, dimethylsilylene(tetramethylcyclopentadienyl)(3-tert-butyl-5-chloro-2-phenoxy)titanium dichloride, dimethylsilylene(tetramethylcyclopentadienyl)(3,5-diamyl-2-phenoxy)titanium dichloride, dimethylsilylene(tetramethylcyclopentadienyl)(3-phenyl-2-phenoxy)titanium dichloride, dimethylsilylene(tetramethylcyclopentadienyl)(1-naphthoxy-2-yl)titanium dichloride, dimethylsilylene(trimethylsilylcyclopentadienyl)(2-phenoxy)titanium dichloride, dimethylsilylene(trimethylsilylcyclopentadienyl)(3-methyl-2-phenoxy)titanium dichloride, dimethylsilylene(trimethylsilylcyclopentadienyl)(3,5-dimethyl-2-phenoxy)titanium dichloride, dimethylsilylene(trimethylsilylcyclopentadienyl)(3-tert-butyl-2-phenoxy)titanium dichloride, dimethylsilylene(trimethylsilylcyclopentadienyl)(3-tert-butyl-5-methyl-2-phenoxy)titanium dichloride, dimethylsilylene(trimethylsilylcyclopentadienyl)(3,5-di-tert-butyl-2-phenoxy)titanium dichloride, dimethylsilylene(trimethylsilylcyclopentadienyl)(5-methyl-3-phenyl-2-phenoxy)titanium dichloride, dimethylsilylene(trimethylsilylcyclopentadienyl)(3-tert-butyldimethylsilyl-5-methyl-2-phenoxy)titanium dichloride, dimethylsilylene(trimethylsilylcyclopentadienyl)(5-methyl-3-trimethylsilyl-2-phenoxy)titanium dichloride, dimethylsilylene(trimethylsilylcyclopentadienyl)(3-tert-butyl-5-methoxy-2-phenoxy)titanium dichloride, dimethylsilylene(trimethylsilylcyclopentadienyl)(3-tert-butyl-5-chloro-2-phenoxy)-titanium dichloride, dimethylsilylene(trimethylsilylcyclopentadienyl)(3,5-diamyl-2-phenoxy)titanium dichloride, dimethylsilylene(trimethylsilylcyclopentadienyl)(3-phenyl-2-phenoxy)titanium dichloride, dimethylsilylene(trimethylsilylcyclopentadienyl)(1-naphthoxy-2-yl) titanium dichloride, dimethylsilylene(indenyl)(2-phenoxy)titanium dichloride, dimethylsilylene(indenyl)(3-methyl-2-phenoxy)titanium dichloride, dimethylsilylene(indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl)(3,5-di-tert-butyl-2-phenoxy)titanium dichloride, dimethylsilylene(indenyl)(5-methyl-3-phenyl-2-phenoxy)titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-diamyl-2-phenoxy)titanium dichloride, dimethylsilylene(indenyl)(3-phenyl-2-phenoxy)titanium dichloride, dimethylsilylene(indenyl)(1-naphthoxy-2-yl)titanium dichloride, dimethylsilylene(fluorenyl)(2-phenoxy)titanium dichloride, dimethylsilylene(fluorenyl)(3-methyl-2-phenoxy)titanium dichloride, dimethylsilylene(fluorenyl)(3,5-dimethyl-2-phenoxy)titanium dichloride, dimethylsilylene(fluorenyl)(3-tert-butyl-2-phenoxy)titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy)titanium dichloride, dimethylsilylene(fluorenyl)(5-methyl-3-phenyl-2-phenoxy)titanium dichloride, dimethylsilylene(fluorenyl)(3-tert-butyldimethylsilyl-5-methyl-2-phenoxy)titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-diamyl-2-phenoxy)titanium dichloride, dimethylsilylene(fluorenyl)(3-phenyl-2-phenoxy)titanium dichloride, dimethylsilylene(fluorenyl)(1-naphthoxy-2-yl)titanium dichloride, (tert-butylamide)tetramethylcyclopentadienyl-1,2-ethanediyltitanium dichloride, (methylamide)tetramethylcyclopentadienyl-1,2-ethanediyltitanium dichloride, (ethylamide)tetramethylcyclopentadienyl-1,2-ethanediyltitanium dichloride, (tert-butylamide)tetramethylcyclopentadienyldimethylsilanetitanium dichloride, (benzylamide)tetramethylcyclopentadienyldimethylsilanetitanium dichloride, (phenylphosphide)tetramethylcyclopentadienyldimethylsilanetitanium dichloride, (tert-butylamide)indenyl-1,2-ethanediyltitanium dichloride, (tert-butylamide)tetrahydroindenyl-1,2-ethanediyltitanium dichloride, (tert-butylamide)fluorenyl-1,2-ethanediyltitanium dichloride, (tert-butylamide)indenyldimethylsilanetitanium dichloride, (tert-butylamide)tetrahydroindenyldimethylsilanetitanium dichloride, (tert-butylamide)fluorenyldimethylsilanetitanium dichloride, (dimethylaminomethyl)tetramethylcyclopentadienyltitanium-(III) dichloride, (dimethylaminoethyl)tetramethylcyclopentadienyltitanium-(III) dichloride, (dimethylaminopropyl)tetramethylcyclopentadienyltitanium-(III) dichloride, (N-pyrrolidinylethyl)tetramethylcyclopentadienyltitanium dichloride, (B-dimethylaminoborabenzene)cyclopentadienyltitanium dichloride, cyclopentadienyl (9-mesitylboraanthracenyl)titanium dichloride and the like; and compounds obtained by changing titanium of these compounds to zirconium or hafnium; compounds obtained by changing (2-phenoxy) thereof to (3-phenyl-2-phenoxy), (3-trimethylsilyl-2-phenoxy) or (3-tert-butyldimethylsilyl-2-phenoxy); compounds obtained by changing dimethylsilylene thereof to methylene, ethylene, dimethylmethylene(isopropylidene), diphenylmethylene, diethylsilylene, diphenylsilylene or dimethoxysilylene; compounds obtained by changing dichloride thereof to difluoride, dibromide, diiodide, dimethyl, diethyl, diisopropyl, diphenyl, dibenzyl, dimethoxide, diethoxide, di(n-propoxide), di(isopropoxide), diphenoxide or di(pentafluorophenoxide); compounds obtained by changing trichloride thereof to trifluoride, tribromide, triiodide, trimethyl, triethyl, triisopropyl, triphenyl, tribenzyl, trimethoxide, triethoxide, tri(n-propoxide), tri(isopropoxide), triphenoxide or tri(pentafluorophenoxide); and the like.

Further, specific examples of the μ-oxo type transition metal compound represented by the general formula [1] include μ-oxobis[isopropylidene(cyclopentadienyl)(2-phenoxy)titanium chloride], μ-oxobis[isopropylidene(cyclopentadienyl)(3-tert-butyl-5-methyl-2-phenoxy)titanium chloride], μ-oxobis[isopropylidene(methylcyclopentadienyl)(2-phenoxy)titanium chloride], μ-oxobis[isopropylidene(methylcyclopentadienyl)(3-tert-butyl-5-methyl-2-phenoxy)titanium chloride], μ-oxobis[isopropylidene(tetramethylcyclopentadienyl)(2-phenoxy)titanium chloride], μ-oxobis[isopropylidene(tetramethylcyclopentadienyl)(3-tert-butyl-5-methyl-2-phenoxy)titanium chloride], μ-oxobis[dimethylsilylene(cyclopentadienyl)(2-phenoxy)titanium chloride], μ-oxobis[dimethylsilylene(cyclopentadienyl)(3-tert-butyl-5-methyl-2-phenoxy)titanium chloride], μ-oxobis[dimethylsilylene(methylcyclopentadienyl)(2-phenoxy)titanium chloride], μ-oxobis[dimethylsilylene(methylcyclopentadienyl)(3-tert-butyl-5-methyl-2-phenoxy)titanium chloride], μ-oxobis[dimethylsilylene(tetramethylcyclopentadienyl)(2-phenoxy)titanium chloride], μ-oxobis[dimethylsilylene(tetramethylcyclopentadienyl)(3-tert-butyl-5-methyl-2-phenoxy)titanium chloride] and the like. In addition, compounds obtained by changing the chlorides of these compounds to fluoride, bromide, iodide, methyl, ethyl, isopropyl, phenyl, benzyl, methoxide, ethoxide, n-propoxide, isopropoxide, phenoxide or pentafluorophenoxide, and the like may be exemplified.

As the compound which ionizes the metallocene compound as the component (II) to form an ionic complex, organoaluminumoxy compounds (IIa), boron compounds (IIb), zinc compounds (IIc), etc. are given.

Examples of the organoaluminumoxy compound as the component (IIa) include tetramethyldialuminoxane, tetraethyldialuminoxane, tetrabutyldialuminoxane, tetrahexyldialuminoxane, methylaluminoxane, ethylaluminoxane, buthylaluminoxane, isobuthylaluminoxane, hexylaluminoxane, etc., and mixtures thereof.

Examples of the boron compound as the component (IIb) include tris(pentafluorophenyl)boron, triphenylcarbeniumtetrakis(pentafluorophenyl)borate, tri(n-butyl)ammoniumtetrakis(pentafluorophenyl)borate, N,N-dimethylaniliniumtetrakis(pentafluorophenyl)borate, etc.

Examples of the zinc compound as the component (IIc) include products obtained by the catalytic treatment of diethyl zinc, fluorinated phenol and water, and the like.

If needed, the fine particle support may carry an organoaluminum compound. Examples of the organoaluminum compound include trialkylaluminums such as trimethylaluminum, triethylaluminum, tri-n-butylaluminum, triisobutylaluminum, tri-n-hexylaluminum and tri-n-octylaluminum; dialkylaluminum hydrides such as diethylaluminum hydride and diisobutylaluminum hydride; dialkylaluminum halides such as diethylaluminum chloride and diisobutylaluminum chloride; and the like. Preferably, the organoaluminum compound is triisobutylaluminum or tri-n-octylaluminum.

To carry the component(s) on the fine particle support, the component(s) is/are contacted with the fine particle support. The component(s) and the fine particle support are contacted with each other usually in an inactive hydrocarbon solvent. Examples of the inactive hydrocarbon include aliphatic hydrocarbons such as propane, normal butane, isobutane, normal pentane, isopentane, normal hexane, cyclohexane and heptane; aromatic hydrocarbons such as benzene and toluene; and the like.

As the solid catalyst component comprising the components (I) and (II) carried on the fine particle support, there can be given the solid catalyst components disclosed in JP-A-61-108610/1986, JP-A-61-296008/1986, JP-A-63-89505/1988, JP-A-6-336502/1994, etc.

As the solid catalyst component comprising the component (II) carried on the fine particle support, there can be given the solid catalyst components disclosed in JP-A-2003-171412, JP-A-2005-68170, etc. Preferable is a solid catalyst component obtained by contacting the following components (a), (b), (c) and (d) with one another.

(a) a compound represented by the general formula [2]:

$$M^2L^2_m \qquad [2],$$

(b) a compound represented by the general formula [3]:

$$R^1_{t-1}TH \qquad [3],$$

(c) a compound represented by the general formula [4]:

$$R^2_{t-2}TH_2 \qquad [4], \text{ and}$$

(d) a fine particle support.

In each of the general formulas [2] to [4], $M^2$ represents a metal atom of Group 1, 2, 12, 14 or 15 of the Periodic Table; m represents a number corresponding to the atomic valence of $M^2$; $L^2$ represents a hydrogen atom, a halogen atom or a hydrocarbyl group, provided that, when a plural number of $L^2$s are present, they may be the same or different; $R^1$ represents a group having an electron withdrawing group or an electron-withdrawing group, provided that, when a plural number of $R^1$s are present, they may be the same or different; $R^2$ represents a hydrocarbyl group or a halogenated hydrocarbyl group; each T independently represents a nonmetal atom of Group 15 or 16 of the Periodic Table; and "t" represents a number corresponding to the atomic valence of T of each of the compounds.

Examples of the component (a) include dimethyl zinc, diethyl zinc, dipropyl zinc, di-n-butyl zinc, diisobutyl zinc, di-n-hexyl zinc and the like. The component (a) is preferably dimethyl zinc or diethyl zinc.

Examples of the component (b) include fluorinated phenols such as pentafluorophenol, 3,5-difluorophenol, 3,4,5-trifluorophenol and 2,4,6-trifluorophenol.

Examples of the component (c) include water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, pentafluoroaniline, 2-(trifluoromethyl) aniline, 3-(trifluoromethyl)aniline, 4-(trifluoromethyl) aniline, 2,6-bis(trifluoromethyl)aniline, 3,5-bis (trifluoromethyl)aniline, 2,4,6-tris(trifluoromethyl)aniline and the like. The component (c) is preferably water or pentafluoroaniline.

To prepolymerize an olefin, the above solid catalyst component and the olefin are fed into a polymerization reactor. When the solid catalyst component which has not the component (I) carried on the support is used, generally, a metallocene compound is also used as the catalyst component in combination. If needed, an organoaluminum compound may be used as the catalyst component in the prepolymerization.

The solid catalyst component is pressure-fed into the polymerization reactor from a catalyst feeder connected to the polymerization reactor. The inner pressure (MPa in unit) of the catalyst feeder at the start of the pressure-feeding is from (Pr+0.0001) to (Pr+1), on the condition that the inner pressure of the polymerization reactor at the start of the pressure-feeding is Pr (MPa in unit). When the inner pressure of the catalyst feeder is too high, agglomeration of the particles is likely to frequently occur. Therefore, the inner pressure of the catalyst feeder is preferably (Pr+0.9) or lower, more preferably (Pr+0.7) or lower. When the inner pressure of the catalyst feeder is too low, the solid catalyst component is likely to remain in the catalyst feeder and the pipe between the catalyst feeder and the polymerization reactor. Therefore, the inner pressure of the catalyst feeder is preferably (Pr+0.001) or higher, more preferably (Pr+0.005) or higher.

The prepolymerization is generally carried out by the slurry polymerization method. The prepolymerization may be carried out by any of batch polymerization, semibatch polymerization and continuous polymerization. Further, a chain transfer agent such as a hydrogen atom may be added in the prepolymerization.

When the prepolymerization is carried out by the slurry polymerization method, a saturated aliphatic hydrocarbon compound is generally used as a solvent. Examples of such a solvent include propane, normal butane, isobutane, normal pentane, isopentane, normal hexane, cyclohexane, heptane and the like. Each of these solvents may be used alone or in combination. The saturated aliphatic hydrocarbon compound has preferably a boiling point of 100° C. or lower, more preferably a boiling point of 90° C. or lower, under a normal pressure. Thus, the use of propane, normal butane, isobutane, normal pentane, isopentane, normal hexane or cyclohexane is more preferable.

When the prepolymerization is carried out by the slurry polymerization method, the density of the solid catalyst component per one liter of the solvent is usually from 0.1 to 600 g, preferably from 0.5 to 300 g, in terms of the fine particle support. The prepolymerization temperature is usually from −20 to 100° C., preferably from 0 to 80° C. While the polymerization temperature may be appropriately changed during the prepolymerization, the temperature for initiating the prepolymerization is preferably 45° C. or lower, more preferably 40° C. or lower. Further, the partial pressure of the olefins in the gas phase zone during the prepolymerization is usually from 0.001 to 2 MPa, preferably from 0.01 to 1 MPa. The prepolymerization time is usually from 2 minutes to 15 hours.

As the olefin to be used in the prepolymerization, ethylene, propylene, 1-butene, 1-pentene, 1-hexene, 1-octene, 4-methyl-1-pentene, cyclopentene, cyclohexene, etc. are given. Each of these olefins may be used alone, or two or more thereof may be used in combination. Preferably, ethylene alone is used, or ethylene is used in combination with α-olefin. More preferably, ethylene alone is used, or ethylene is used in combination with at least one α-olefin selected from 1-butene, 1-hexene and 1-octene.

The prepolymerization rate is preferably 10 g/hour or lower, more preferably 8.0 g/hour or lower, per 1 g of the fine particle support, in order to suppress the agglomeration of particles. Further, preferably, the prepolymerization rate is 0.1 g/hour or higher, in order to improve the polymerization performance of the catalyst.

The content of a polymer, obtained by the prepolymerization, in the prepolymerization catalyst, is usually from 0.01 to 1,000 g, preferably from 0.05 to 500 g, more preferably from 0.1 to 200 g, per 1 g of the solid catalyst component.

The weight-average particle diameter of the prepolymerization catalyst for polymerization of an olefin is preferably from 40 to 1,000 μm, more preferably from 50 to 500 μm. The weight-average particle diameter is measured with a laser diffraction type particle size distribution-measuring apparatus (e.g. HELOS & RODOS manufactured by JEOL LTD.).

The prepolymerization catalyst obtained by the present invention can be used as a polymerization catalyst for producing an olefin polymer. As the olefin, $C_2$-$C_{20}$ (mono)olefins and diolefins are preferred. Examples thereof include linear α-olefins such as ethylene, propylene, 1-butene, 1-pentene, 4-methyl-1-pentene, 5-methyl-1-hexene, 1-hexene, 1-heptene, 1-octene, 1-nonene and 1-decene; cyclic olefins such as norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyl tetracyclododecene, 8-methyl-8-tetracyclododecene and 8-cyanotetracyclododecene; diolefins such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, norbornadiene, 5-methylene-2-norbornene, 1,5-cyclooctadiene, 5,8-endomethylenehexahydronaphthalene, 1,3-butadiene, isoprene, 1,3-hexadiene, 1,3-octadiene, 1,3-cyclooctadiene and 1,3-cyclohexadiene, and the like. Each of these olefins may be used alone, or two or more thereof may be used in combination. More preferably, an olefin other than ethylene is used in combination with ethylene. Still more preferably, ethylene alone is used, or ethylene is used in combination with an α-olefin. Far still more preferably, ethylene alone is used, or at least one α-olefin selected from 1-butene, 1-hexene and 1-octene is used in combination with ethylene.

As the polymerization process of the olefin, using the prepolymerization catalyst, the gas phase polymerization process is preferably employed, and a fluidized bed type gas phase polymerization process is more preferably employed. As a gas phase polymerization reactor to be used in the gas phase polymerization of the olefin, the fluidized bed type gas phase polymerization reactors described in, for example, JP-A-58-201802/1983, JP-A-59-126406/1984, JP-A-2-233708/1990, JP-A-4-234409/1992 and JP-A-7-62009/1995 may be used. In addition, a plurality of gas phase polymerization reactors may be used; or a reactor other than the gas phase polymerization reactor may be used in combination with the gas phase polymerization reactor.

In the gas phase polymerization of the olefin using the prepolymerization catalyst, the polymerization temperature is usually from 30 to 110° C., preferably from 60 to 100° C. The polymerization pressure may fall within such a range that the olefin can be present as a gas phase in the gas phase polymerization reactor, and it is usually from 0.1 to 5.0 MPa, preferably from 1.5 to 3.0 MPa. The gas flow rate in the gas phase polymerization reactor is usually from 10 to 100 cm/sec., preferably from 20 to 70 cm/sec.

In the gas phase polymerization of the olefin, if needed, other catalyst component such as an organoaluminum compound, an organoaluminum oxy compound, a boron compound or the like may be used in addition to the prepolymerization catalyst. The gas phase polymerization of the olefin may be carried out in the presence of an additive such as a fluidization aid or a static electricity removing additive, and may be carried out in the presence of a chain transfer agent such as hydrogen.

EXAMPLES

Hereinafter, the present invention will be explained in more detail by way of Examples and Comparative Examples.

Measurements of the items in Examples were determined according to the methods described below.

(1) Density (Unit: Kg/m$^3$)

The density was measured according to the method specified in JIS K7112-1980, method A. The sample was subjected to annealing described in JIS K6760-1995.

(2) Melt Flow Rate (MFR, Unit: g/10 min)

The melt flow rate was measured according to the method specified in JIS K7210-1995, under a condition of the load being 21.18 N, and the temperature being 190° C.

(3) Molecular Weight Distribution (Mw/Mn)

The molecular weight distribution was measured by gel permeation chromatography (GPC) under the following conditions. Calibration curve was constructed using standard polystyrene. The molecular weight distribution was evaluated in terms of a ratio (Mw/Mn) of the weight average molecular weight (Mw) to the number average molecular weight (Mn).

| Apparatus model: | Type 150C, manufactured by Millipore Waters |
| --- | --- |
| Column: | TSK-GEL GMH-HT 7.5 × 600, two columns |
| Measurement temperature: | 140° C. |
| Solvent: | Orthodichlorobenzene |

-continued

| Solvent flow rate: | 1.0 mL/min |
| --- | --- |
| Measurement concentration: | 5 mg/5 ml |
| Detector: | differential refractometry |

(4) Average Particle Diameter (Unit: μm)

The prepolymerization catalyst in a dried state was dispersed to measure the particle size distribution with a laser diffraction type particle size distribution-measuring apparatus (HELOS & RODOS system manufactured by SYMPATEC), and a volume-based average particle diameter of the catalyst was calculated.

(5) Amount of Fine Particles (Unit: vol. %)

The amount of particles with particle diameters of 60 μm or less was calculated in terms of volume, from the particle size distribution measured in the above item (4).

(6) Amount of Agglomeration (Unit: wt. %)

The amount of the agglomeration in an ethylene-α-olefin copolymer powder was determined as a weight ratio of the powder left to remain on a sieve with a sieve opening of 5 mm, when the particles were shifted with the same sieve.

Example 1

(1) Preparation of Solid Catalyst Component

A solid component was obtained in the same manner as in the preparation of the component (A) in the items (1), (2) and (3) of Example 1 of JP-A-2005-68170.

(2) Prepolymerization

A prepolymerization apparatus in which a reactor having an internal volume of 210 liter, equipped with a stirrer and previously displaced with nitrogen, was connected to a catalyst feeder having an internal volume of 2.5 liter and previously displaced with nitrogen, through a pipe having a valve was used. In this prepolymerization apparatus, the catalyst feeder was charged with the above solid component (709 g), and then was filled with nitrogen so that the inner pressure of the catalyst feeder could be 0.1 MPa higher than that of the reactor. The valve was opened to pressure-feed the solid component to the reactor. Then, the valve was closed, and the following operation was repeated twice: that is, the catalyst feeder was filled with nitrogen until the inner pressure of the catalyst feeder was 0.1 MPa higher than that of the reactor; the valve was then opened to pressure-feed the nitrogen; and the valve was closed. Next, the reactor was charged with butane (80 liters) and ethylene (0.1 kg) and was then controlled in temperature to 30° C. After the system had been stabilized, triisobutylaluminum (210 mmol) and lacemi-ethylenebis(1-indenyl)zirconium diphenoxide (70 mmol) were pressure-fed from the catalyst feeder to initiate the polymerization. After the initiation of the polymerization, the polymerization was carried out for 0.5 hours while the inner temperature of the reactor was being adjusted to 30° C. After that, the inner temperature of the reactor was raised to 50° C. in 30 minutes, and the polymerization was then carried out at 50° C. For the first 0.5 hours, ethylene was fed at a rate of 0.4 kg/hour; and from after 0.5 hours since the initiation of the polymerization, ethylene was fed at a rate of 3.5 kg/hour, and hydrogen was fed at a rate of 5.3 liters/hour in terms of volume at a normal temperature under a normal pressure. Thus, the prepolymerization was continued for total 4 hours. After the completion of the prepolymerization, the reactor was purged until the inner pressure thereof reached 0.5 MPaG, to obtain slurry of a prepolymerization catalyst. This slurry was transferred to a drier and was dried under a stream of nitrogen. Thus, the prepolymerization catalyst was prepared. The amount of a prepolymerized ethylene polymer in the prepolymerization catalyst was 15.0 g per 1 g of the solid catalyst component, and the average particle diameter of the prepolymerization catalyst was 128 μm. The proportion of the particles with particle diameters of 60 m or less was 0%.

(3) Gas-Phase Polymerization

Ethylene and 1-hexene were copolymerized, using a fluidized bed type gas-phase continuous polymerization reactor, under the following conditions:

| | |
|---|---|
| Polymerization temperature: | 75° C. |
| Pressure: | 2.0 MPaG, |
| Hold-up amount: | 80 kg |
| Gas composition: | 91.32 mol % of ethylene, |
| | 0.77 mol % of hydrogen, |
| | 0.81 ruol % of 1-hexene |
| | 7.10 mol % of nitrogen |
| Linear speed of circulated gas: | 0.25 m/sec. |
| Feed amount of prepolymerization catalyst: | 22 g/hour |
| Feed amount of triethylamine: | 0.6 mmol/hour |
| Feed amount of triisobutylaluminum: | 20 mmol/hour. |

As a result, powder of an ethylene-1-hexene copolymer was obtained at a production rate of about 22 kg/hour. The amount of agglomerated particles in the ethylene-1-hexene copolymer powder was 100 wt. ppm. The density of the ethylene-1-hexene copolymer was 919.4 kg/m$^3$; the MFR thereof was 0.44 g/10 minutes; and the Mw/Mn thereof was 9.0.

Example 2

(1) Preparation of Solid Catalyst Component

A solid component was obtained in the same manner as in the preparation of the component (A) in the items (1), (2) and (3) of Example 1 of JP-A-2005-68170.

(2) Prepolymerization

A prepolymerization apparatus in which a reactor having an internal volume of 210 liter, equipped with a stirrer and previously displaced with nitrogen, was connected to a catalyst feeder having an internal volume of 2.5 liter and previously displaced with nitrogen, through a pipe having a valve was used. In this prepolymerization apparatus, the catalyst feeder was charged with the above solid component (713 g) followed by butane (1.5 L), and was then filled with nitrogen so that the inner pressure of the catalyst feeder could be 0.35 MPa higher than that of the reactor. The valve was opened to pressure-feed the solid component to the reactor. Then, the valve was closed, and the following operation was repeated twice: that is, the catalyst feeder was charged with butane (1.5 L) and was filled with nitrogen until the inner pressure of the catalyst feeder was 0.35 MPa higher than that of the reactor; the valve was then opened to pressure-feed the butane (1.5 L); and the valve was closed. Next, the reactor was charged with butane (80 liters), 1-butene (20 g), hydrogen (3 liters in terms of volume at a normal temperature under a normal pressure) and ethylene (0.1 kg), and the reactor was then controlled in temperature to 30° C. After the system had been stabilized, triisobutylaluminum (210 mmol) and lacemi-ethylenebis(1-indenyl)zirconium diphenoxide (70 mmol) were pressure-fed from the catalyst feeder to initiate the polymerization. After the initiation of the polymerization, the polymerization was carried out for 0.5 hours while the inner temperature of the reactor was being adjusted to 30° C. After that, the inner temperature of the reactor was raised to 50° C. in 30 minutes, and the polymerization was then continued at 50° C. For the first 0.5 hours, ethylene was fed at a rate of 0.4 kg/hour, and hydrogen was fed at a rate of 4.3 liters/hour in terms of volume at a normal temperature under a normal pressure. From after 0.5 hours since the initiation of the polymerization, ethylene was fed at a rate of 2.8 kg/hour, and hydrogen was fed at a rate of 22.2 liters/hour in terms of volume at a normal temperature under a normal pressure. Thus, the prepolymerization was continued for total 4 hours. After the completion of the prepolymerization, the reactor was purged until the inner pressure thereof reached 0.5 MPaG, to obtain slurry of a prepolymerization catalyst. This slurry was transferred to a drier and was dried under a stream of nitrogen. Thus, the prepolymerization catalyst was obtained. The amount of a prepolymerized ethylene-1-butene copolymer in the prepolymerization catalyst was 14.9 g per 1 g of the solid catalyst component, and the average particle diameter of the prepolymerization catalyst was 127 m. The proportion of the particles with particle diameters of 60 μm or less was 2.5%.

Example 3

(1) Preparation of Solid Catalyst Component

A solid component was obtained in the same manner as in the preparation of the component (A) in the items (1), (2) and (3) of Example 1 of JP-A-2005-68170.

(2) Prepolymerization

A prepolymerization apparatus in which a reactor having an internal volume of 210 liter, equipped with a stirrer and previously displaced with nitrogen, was connected to a catalyst feeder having an internal volume of 2.5 liter and previously displaced with nitrogen, through a pipe having a valve was used. In this prepolymerization apparatus, the catalyst feeder was charged with the above solid component (709 g) followed by butane (1.5 L), and was then filled with nitrogen so that the inner pressure of the catalyst feeder could be 0.6 MPa higher than that of the reactor. The valve was opened to pressure-feed the solid component to the reactor. Then, the valve was closed, and the following operation was repeated twice: that is, the catalyst feeder was charged with butane (1.5 L) and filled with nitrogen until the inner pressure of the catalyst feeder was 0.6 MPa higher than that of the reactor; the valve was opened to pressure-feed the butane (1.5 L); and the valve was closed. Next, the reactor was charged with butane (80 liters), 1-butene (20 g), hydrogen (3 L in terms of volume at a normal temperature under a normal pressure) and ethylene (0.1 kg), and the reactor was then controlled in temperature to 30° C. After the system had been stabilized, triisobutylaluminum (210 mmol) and lacemi-ethylenebis(1-indenyl) zirconium diphenoxide (701 mmol) were pressure-fed from the catalyst feeder to initiate the polymerization. After the initiation of the polymerization, the polymerization was carried out for 0.5 hours while the inner temperature of the reactor was being adjusted to 30° C. After that, the inner temperature of the reactor was raised to 50° C. in 30 minutes, and hydrogen was fed at a rate of 3.2 liter/hour in terms of volume at a normal temperature under a normal pressure. After that, the polymerization was carried out at 50° C. For the first 0.5 hours, ethylene was fed at a rate of 0.4 kg/hour. From after 0.5 hours since the initiation of the polymerization, ethylene was fed at a rate of 2.8 kg/hour, and hydrogen was fed at a rate of 22.2 liters/hour in terms of volume at a normal temperature under a normal pressure. Thus, the prepolymerization was continued for total 4 hours. After the completion of the prepolymerization, the reactor was purged until the inner pressure thereof reached 0.5 MPaG, to obtain slurry of a prepolymerization catalyst. The slurry was transferred to a drier and was dried under a stream of nitrogen. Thus, the prepolymerization catalyst was prepared. The amount of a prepolymerized ethylene-1-butene copolymer in the prepolymerization catalyst was 11.9 g per 1 g of the solid catalyst component, and the average particle diameter of the prepolymerization catalyst was 117 μm. The proportion of the particles with particle diameters of 60 μm or less was 5.3%.

(3) Gas Phase Polymerization

Ethylene and 1-hexene were copolymerized, using a fluidized bed type gas-phase continuous polymerization reactor, under the following conditions:

| | |
|---|---|
| Polymerization temperature: | 84° C. |
| Pressure: | 2.0 MPaG, |
| Hold-up amount: | 80 kg |
| Gas composition: | 93.60 mol % of ethylene, |
| | 0.26 mol % of hydrogen, |
| | 0.85 mol % of 1-hexene, |
| | 5.29 mol % of nitrogen |
| Linear speed of circulated gas: | 0.25 m/sec. |
| Feed amount of the prepolymerization catalyst: | 21 g/hour |
| Feed amount of triethylamine: | 0.6 mmol/hour |
| Feed amount of triisobutylaluminum: | 20 mmol/hour. |

As a result, powder of an ethylene-1-hexene copolymer was obtained at a production rate of about 20 kg/hour. The amount of agglomerated particles in the ethylene-1-hexene copolymer powder was 200 wt. ppm. The density of the ethylene-1-hexene copolymer was 926.6 kg/m$^3$; the MFR thereof was 0.26 g/10 minutes; and the Mw/Mn thereof was 9.2.

Comparative Example 1

(1) Preparation of Solid Catalyst Component

A solid component was obtained in the same manner as in the preparation of the component (A) in the items (1), (2) and (3) of Example 1 of JP-A-2005-68170.

(2) Prepolymerization

A prepolymerization apparatus in which a reactor having an internal volume of 210 liter, equipped with a stirrer and previously displaced with nitrogen, was connected to a catalyst feeder having an internal volume of 2.5 liter and previously displaced with nitrogen, through a pipe having a valve was used. In this prepolymerization apparatus, the catalyst feeder was charged with the above solid component (699 g), followed by butane (1.5 L), and was filled with nitrogen so that the inner pressure of the catalyst feeder could be 2.0 MPa higher than that of the reactor. The valve was opened to pressure-feed the solid component to the reactor. Then, the valve was closed, and the following operation was repeated twice: that is, the catalyst feeder was charged with butane (1.5 L) and was filled with nitrogen until the inner pressure of the catalyst feeder was 2.0 MPa higher than that of the reactor; the valve was then opened to pressure-feed the butane (1.5 L); and the valve was closed. Next, the reactor was charged with butane (80 liters), 1-butene (8 g), hydrogen (6 liter) in terms of volume at a normal temperature under a normal pressure, and ethylene (0.1 kg), and the reactor was then controlled in temperature to 40° C. After the system had been stabilized, triisobutylaluminum (210 mol) and lacemi-ethylenebis(1-indenyl)zirconium diphenoxide (701 mmol) were pressure-fed from the catalyst feeder to initiate the polymerization. After the initiation of the polymerization, the polymerization was carried out for 0.5 hours while the inner temperature of the reactor was being adjusted to 40° C. After that, the inner temperature of the reactor was raised to 50° C. in 30 minutes, and the polymerization was then carried out at 50° C. For the first 0.5 hours, ethylene was fed at a rate of 0.5 kg/hour, and hydrogen was fed at a rate of 5.2 liter/hour in terms of volume at a normal temperature under a normal pressure. From after 0.5 hours since the initiation of the polymerization, ethylene was fed at a rate of 2.4 kg/hour, and hydrogen was fed at a rate of 23.1 liters/hour in terms of volume at a normal temperature under a normal pressure. Thus, the prepolymerization was continued for total 4 hours. After the completion of the prepolymerization, the reactor was purged until the inner pressure thereof reached 0.5 MPaG, to obtain slurry of a prepolymerization catalyst. This slurry was transferred to a drier and was dried under a stream of nitrogen. Thus, the prepolymerization catalyst was prepared. The amount of a prepolymerized ethylene-1-butene copolymer in the prepolymerization catalyst was 14.3 g per 1 g of the solid catalyst component, and the average particle diameter thereof was 98 μm. The proportion of the particles with particle diameters of 60 μm or less was 28%.

(3) Gas Phase Polymerization

Ethylene and 1-hexene were copolymerized, using a fluidized bed type gas-phase continuous polymerization reactor, under the following conditions:

| | |
|---|---|
| Polymerization temperature: | 75° C. |
| Pressure: | 2.0 MPaG, |
| Hold-up amount: | 80 kg |
| Gas composition: | 91.2 mol % of ethylene, |
| | 0.83 mol % of hydrogen, |
| | 0.82 mol % of 1-hexene |
| | 7.15 mol % of nitrogen |
| Linear speed of circulated gas: | 0.25 m/sec. |
| Feed amount of the prepolymerization catalyst: | 20 g/hour |
| Feed amount of triethylamine: | 0.6 mmol/hour. |

Feed amount of triisobutylaluminum: 20 mmol/hour. As a result, powder of an ethylene-1-hexene copolymer was obtained at a production rate of about 18 kg/hour. The amount of agglomerated particles in the ethylene-1-hexene copolymer powder was 2,600 wt. ppm. The density of the ethylene-1-hexene copolymer was 920.1 kg/m$^3$; and the MFR thereof was 0.58 g/10 minutes.

Comparative Example 2

(1) Preparation of Solid Catalyst Component

A solid component was obtained in the same manner as in the preparation of the component (A) in the items (1) and (2) of Example 10 of JP-A-2003-171415.

(2) Prepolymerization

A prepolymerization apparatus in which a reactor having an internal volume of 210 liter, equipped with a stirrer and previously displaced with nitrogen, was connected to a catalyst feeder having an internal volume of 2.5 liter and previously displaced with nitrogen, through a pipe having a valve was used. In this prepolymerization apparatus, the catalyst feeder was charged with the above solid component (697 g), followed by butane (1.5 L), and was filled with nitrogen so that the inner pressure of the catalyst feeder could be 1.6 MPa higher than that of the reactor. The valve was opened to pressure-feed the solid component to the reactor. Then, the valve was closed, and the following operation was repeated twice: that is, the catalyst feeder was charged with butane (1.5 L) and was filled with nitrogen until the inner pressure of the catalyst feeder was 1.6 MPa higher than that of the reactor; the valve was then opened to pressure-feed the butane (1.5 L); and the valve was closed. Next, the reactor was charged with butane (80 liters), 1-butene (8 g), hydrogen (12 L) in terms of volume at a normal temperature under a normal pressure, and ethylene (0.2 kg). The reactor was then controlled in temperature to 40° C. After the system had been stabilized, triisobutylaluminum (210 mmol) and lacemi-ethylenebis(1-indenyl) zirconium diphenoxide (70 mmol) were pressure-fed from the catalyst feeder to initiate the polymerization. After the initiation of the polymerization, the polymerization was carried out for 0.5 hours while the inner temperature of the reactor was being adjusted to 40° C. After that, the inner temperature of the reactor was raised to 50° C. in 30 minutes, and the polymerization was then carried out at 50° C. For the first 0.5 hours, ethylene was fed at a rate of 0.4 kg/hour, and hydrogen was fed at a rate of 3.5 liter/hour in terms of volume at a normal temperature under a normal pressure. From after 0.5 hours since the initiation of the polymerization, ethylene was fed at a rate of 1.7 kg/hour, and hydrogen was fed at a rate of 12.1 liters/hour in terms of volume at a normal temperature under a normal pressure. Thus, the prepolymerization was continued for total 6 hours. After the completion of the prepolymerization, the reactor was purged until the inner pressure thereof reached 0.5 MPaG, to obtain slurry of a prepolymerization catalyst. The slurry was transferred to a drier and was dried under a stream of nitrogen. Thus, the prepolymerization catalyst was prepared. The amount of a prepolymerized ethylene-1-butene copolymer in the prepolymerization catalyst was 12.1 g per 1 g of the solid catalyst component, and the average particle diameter thereof was 106 μm. The proportion of the particles with particle diameters of 60 μm or less was 22%.

(3) Gas Phase Polymerization

Ethylene and 1-hexene were copolymerized, using a fluidized bed type gas-phase continuous polymerization reactor, under the following conditions:

| | |
|---|---|
| Polymerization temperature: | 75° C. |
| Pressure: | 2.0 MPaG, |
| Hold-up amount: | 80 kg |
| Gas composition: | 89.8 mol % of ethylene, |
| | 0.55 mol % of hydrogen, |
| | 0.92 mol % of 1-hexene |
| | 8.73 mol % of nitrogen |
| Linear speed of circulated gas: | 0.28 m/sec. |
| Feed amount of the prepolymerization catalyst: | 21 g/hour |
| Feed amount of triisobutylaluminum: | 20 mmol/hour. |

As a result, powder of an ethylene-1-hexene copolymer was obtained at a production rate of about 17 kg/hour. The amount of agglomerated particles in the ethylene-1-hexene copolymer powder was 2,700 wt. ppm. The density of the ethylene-1-hexene copolymer was 919.2 kg/m$^3$; and the MFR thereof was 0.18 g/10 minutes.

Comparative Example 3

(1) Preparation of Solid Catalyst Component

A solid component was obtained in the same manner as in the preparation of the component (A) in the items (1) and (2) of Example 10 of JP-A-2003-171415.

(2) Prepolymerization

A prepolymerization apparatus in which a reactor having an internal volume of 210 liter, equipped with a stirrer and previously displaced with nitrogen, was connected to a catalyst feeder having an internal volume of 2.5 liter and previously displaced with nitrogen, through a pipe having a valve was used. In this prepolymerization apparatus, the catalyst feeder was charged with the above solid component (678 g), followed by butane (1.5 L), and was then filled with nitrogen so that the inner pressure of the catalyst feeder could be 1.2 MPa higher than that of the reactor. The valve was opened to pressure-feed the solid component to the reactor. Then, the valve was closed, and the following operation was repeated twice: that is, the catalyst feeder was charged with butane (1.5 L) and was filled with nitrogen until the inner pressure of the catalyst feeder was 1.2 MPa higher than that of the reactor; the valve was then opened to pressure-feed the butane (1.5 L); and the valve was closed. Next, the reactor was charged with butane (80 liters), 1-butene (20 g), hydrogen (12 liter) in terms of volume at a normal temperature under a normal pressure, and ethylene (0.1 kg). Then, the reactor was controlled in temperature to 40° C. After the system had been stabilized, triisobutylaluminum (210 mmol) and lacemi-ethylenebis(1-indenyl)zirconium diphenoxide (70 mmol) were pressure-fed from the catalyst feeder to initiate the polymerization. After the initiation of the polymerization, the polymerization was carried out for 0.5 hours while the temperature of the reactor was being adjusted to 40° C. After that, the inner temperature of the reactor was raised to 50° C. in 30 minutes, and the polymerization was then carried out at 50° C. For the first 0.5 hours, ethylene was fed at a rate of 0.3 kg/hour, and hydrogen was fed at a rate of 5.4 liter/hour in terms of volume at a normal temperature under a normal pressure. From after 0.5 hours since the initiation of the polymerization, ethylene was fed at a rate of 1.7 kg/hour, and hydrogen was fed at a rate of 14.1 liters/hour in terms of volume at a normal temperature under a normal pressure. Thus, the prepolymerization was continued for total 6 hours. After the completion of the prepolymerization, the reactor was purged until the inner pressure thereof reached 0.5 MPaG, to obtain slurry of a prepolymerization catalyst. The slurry was transferred to a drier and was dried under a stream of nitrogen. Thus, the prepolymerization catalyst was prepared. The amount of a prepolymerized ethylene-1-butene copolymer in the prepolymerization catalyst was 14.1 g per 1 g of the solid catalyst component, and the average particle diameter thereof was 98 μm. The proportion of the particles with particle diameters of 60 μm or less was 23%.

(3) Gas Phase Polymerization

Ethylene and 1-hexene were copolymerized, using a fluidized bed type gas-phase continuous polymerization reactor, under the following conditions:

| | |
|---|---|
| Polymerization temperature: | 75° C. |
| Pressure: | 2.0 MPaG, |
| Hold-up amount: | 80 kg |
| Gas composition: | 88.5 mol % of ethylene, |
| | 0.46 mol % of hydrogen, |
| | 1.00 mol % of 1-hexene |
| | 10.04 mol % of nitrogen |
| Linear speed of circulated gas: | 0.25 m/sec. |
| Feed amount of the prepolymerization catalyst: | 34 g/hour |
| Feed amount of triisobutylaluminum: | 20 mmol/hour |

As a result, powder of an ethylene-1-hexene copolymer was obtained at a production rate of about 19 kg/hour. The amount of agglomerated particles in the ethylene-1-hexene copolymer powder was 1,600 wt. ppm. The density of the ethylene-1-hexene copolymer was 915.0 kg/m³; and the MFR thereof was 0.57 g/10 minutes.

Example 4

(1) Preparation of Solid Catalyst Component

A solid component was obtained in the same manner as in the preparation of the component (A) in the items (1), (2) and (3) of Example 1 of JP-A-2005-68170.

(2) Prepolymerization

A prepolymerization apparatus in which a reactor having an internal volume of 210 liter, equipped with a stirrer and previously displaced with nitrogen, was connected to a catalyst feeder having an internal volume of 2.5 liter and previously displaced with nitrogen, through a pipe having a valve was used. In this prepolymerization apparatus, the catalyst feeder was charged with the above solid component (709 g), and was then filled with nitrogen so that the inner pressure of the catalyst feeder could be 0.01 MPa higher than that of the reactor. The valve was opened to pressure-feed the solid component to the reactor. Then, the valve was closed, and the following operation was repeated twice: that is, the catalyst feeder was filled with nitrogen until the inner pressure of the catalyst feeder was 0.01 MPa higher than that of the reactor; the valve was then opened to pressure-feed the nitrogen; and the valve was closed. Next, the reactor was charged with butane (80 liters), ethylene (0.1 kg) and hydrogen (0.1 liter) in terms of volume at a normal temperature under a normal pressure. Then, the reactor was then controlled in temperature to 30° C. After the system had been stabilized, triisobutylaluminum (210 mmol) and lacemi-ethylenebis(1-indenyl)zirconium diphenoxide (90 mmol) were pressure-fed from the catalyst feeder to initiate the polymerization. After the initiation of the polymerization, the polymerization was carried out for 0.5 hours while the temperature of the reactor was being adjusted to 30° C. After that, the inner temperature of the reactor was raised to 50° C. in 30 minutes, and the polymerization was then carried out at 50° C. For the first 0.5 hours, ethylene was fed at a rate of 0.7 kg/hour, and hydrogen was fed at a rate of 0.6 liter/hour in terms of volume at a normal temperature under a normal pressure. From after 0.5 hours since the initiation of the polymerization, ethylene was fed at a rate of 3.2 kg/hour, and hydrogen was fed at a rate of 9.6 liters/hour in terms of volume at a normal temperature under a normal pressure. Thus, the prepolymerization was continued for total 6 hours. After the completion of the prepolymerization, the reactor was purged until the inner pressure thereof reached 0.5 MPaG, to obtain slurry of a prepolymerization catalyst. The slurry was transferred to a drier and was dried under a stream of nitrogen. Thus, the prepolymerization catalyst was prepared. The amount of a prepolymerized ethylene polymer in the prepolymerization catalyst was 23.8 g per 1 g of the solid catalyst component, and the average particle diameter thereof was 139 μm. The proportion of the particles with particle diameters of 60 μm or less was 0%.

(3) Gas Phase Polymerization

Ethylene, 1-butene and 1-hexene were copolymerized, using a fluidized bed type gas-phase continuous polymerization reactor, under the following conditions:

| | |
|---|---|
| Polymerization temperature: | 84° C. |
| Pressure: | 2.0 MPaG, |
| Hold-up amount: | 80 kg |

-continued

| | |
|---|---|
| Gas composition: | 90.30 mol % of ethylene, 1.45 mol % of hydrogen, 1.93 mol % of 1-butene, 0.95 mol % of 1-hexene, 5.37 mol % of nitrogen |
| Linear speed of circulated gas: | 0.34 m/sec. |
| Feed amount of the prepolymerization catalyst: | 44 g/hour |
| Feed amount of triethylamine: | 0.6 mmol/hour |
| Feed amount of triisobutylaluminum: | 21 mmol/hour. |

As a result, powder of an ethylene-1-butene-1-hexene copolymer was obtained at a production rate of about 22 kg/hour. The amount of agglomerated particles in the ethylene-1-butene-1-hexene copolymer powder was 96 wt. ppm. The density of the ethylene-1-butene-1-hexene copolymer was 917.2 kg/m³; the MFR thereof was 1.43 g/10 minutes; and the Mw/Mn was 7.8.

The major embodiments and the preferred embodiments of the present invention are listed below.

[1] A process for producing a prepolymerization catalyst for polymerization of an olefin, said process comprising the steps of feeding, to a polymerization reactor, an olefin and a solid catalyst component in which a catalyst component for polymerization of the olefin is carried on a fine particle support, and prepolymerizing the olefin in the presence of the solid catalyst component in the polymerization reactor, to thereby obtain the prepolymerization catalyst in which the olefin is prepolymerized on the solid catalyst component, said process being characterized in that said solid catalyst component is pressure-fed to the polymerization reactor from a catalyst feeder connected to the polymerization reactor, and in that the inner pressure of the catalyst feeder at the start of the pressure-feeding is set at (Pr+0.0001) to (Pr+1) (MPa in unit) (in which Pr represents the inner pressure of the polymerization reactor (MPa in unit) at the start of the pressure-feeding).

[2] The process according to [1], wherein said fine particle support is an inorganic oxide.

[3] The process according to [1] or [2], wherein the prepolymerization rate is 10 g/hour or less per 1 g of the fine particle support.

[4] A process for producing an olefin polymer, characterized in that the prepolymerization catalyst for polymerization of an olefin, produced by any of the processes of [1] to [3], is fed to a fluidized bed type gas-phase polymerization reactor to carry out the gas-phase polymerization of the olefin.

The invention claimed is:

1. A process for producing a prepolymerization catalyst for polymerization of an olefin, said process comprising the steps of feeding, to a prepolymerization reactor, an olefin and a solid catalyst component in which a catalyst component for polymerization for the olefin is carried on a fine particle support, and prepolymerizing the olefin in the presence of the solid catalyst component in the prepolymerization reactor, to thereby obtain the prepolymerization catalyst in which the olefin is prepolymerized on the solid catalyst component, said process being characterized in that said solid catalyst component is pressure-fed to the prepolymerization reactor from a catalyst feeder connected to the prepolymerization reactor, and in that the inner pressure of the catalyst feeder at the start of the pressure-feeding is set at (Pr+0.0001) to (Pr+1) (MPa in unit) (in which Pr represents the inner pressure of the prepolymerization reactor (MPa in unit) at the start of the pressure feeding).

2. The process according to claim 1, wherein said fine particle support is an inorganic oxide.

3. The process according to claim 1, wherein the prepolymerization rate is 10 g/hour or less per 1 g of the fine particle support.

4. A process for producing an olefin polymer, characterized in that the prepolymerization catalyst for polymerization of an olefin, produced by any of the processes of claim 1, is fed to a fluidized bed type gas-phase polymerization reactor to carry out the gas-phase polymerization of the olefin.

5. The process according to claim 2, wherein the prepolymerization rate is 10 g/hour or less per 1 g of the fine particle support.

6. A process for producing an olefin polymer, characterized in that the prepolymerization catalyst for polymerization of an olefin, produced by the process of claim 2, is fed to a fluidized bed type gas-phase polymerization reactor to carry out the gas-phase polymerization of the olefin.

* * * * *